April 7, 1953
H. B. TROMBLEY
2,634,354
SEAM WELDING MACHINE FOR PIPES
Filed April 5, 1951
4 Sheets-Sheet 1
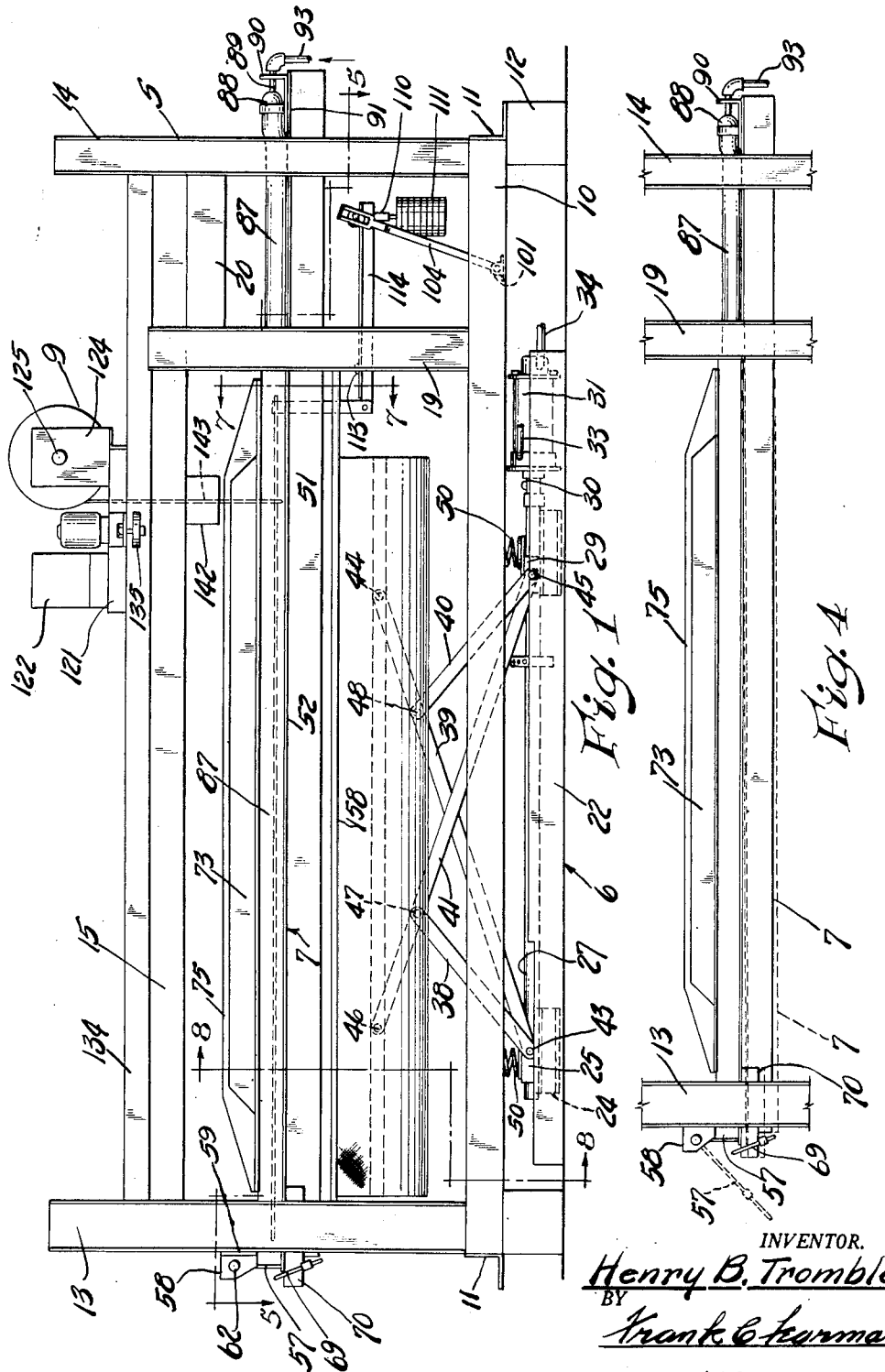
INVENTOR.
Henry B. Trombley.
BY
Frank C. Kerman.
ATTORNEY

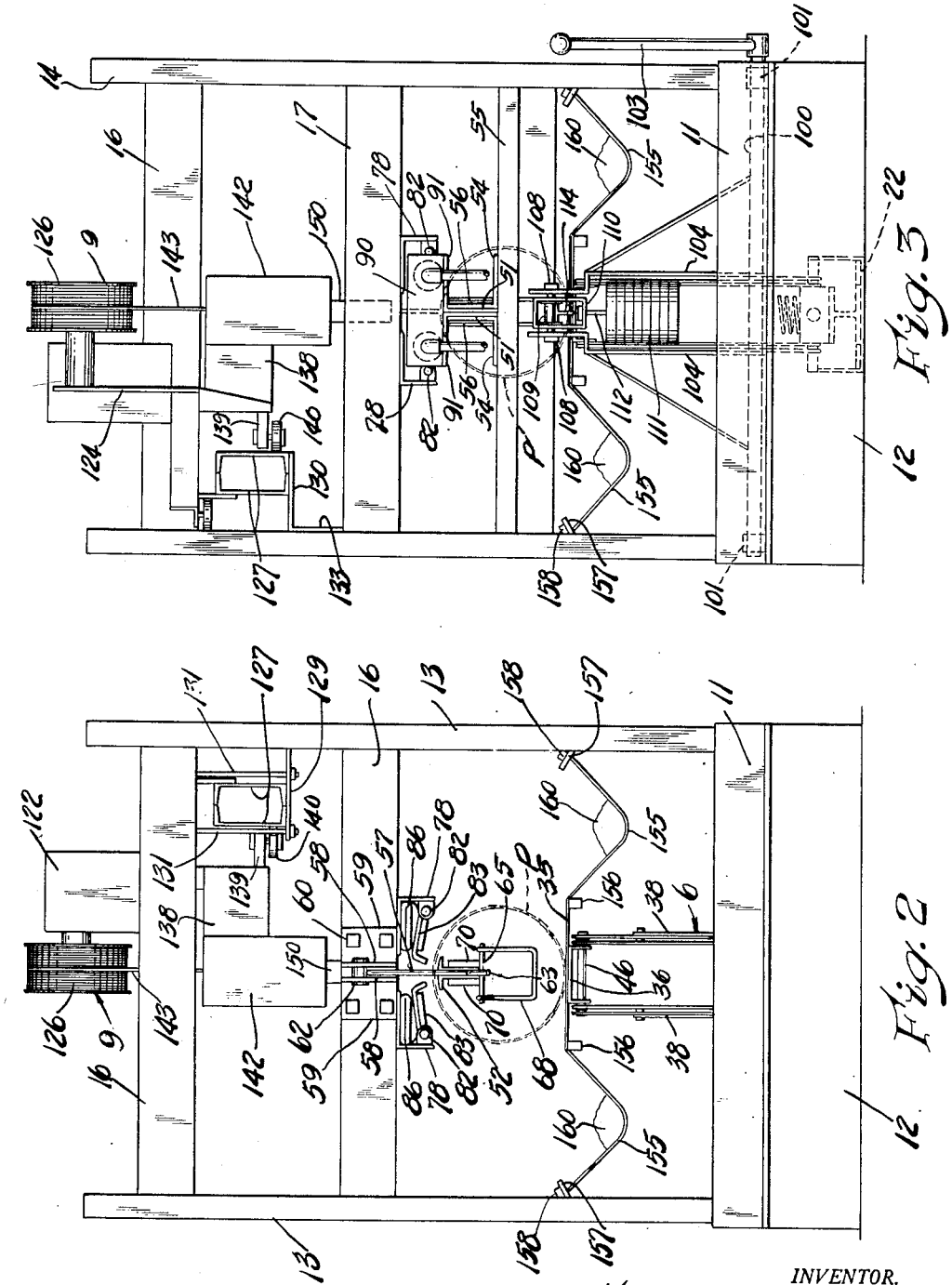

April 7, 1953 H. B. TROMBLEY 2,634,354
SEAM WELDING MACHINE FOR PIPES
Filed April 5, 1951 4 Sheets-Sheet 3
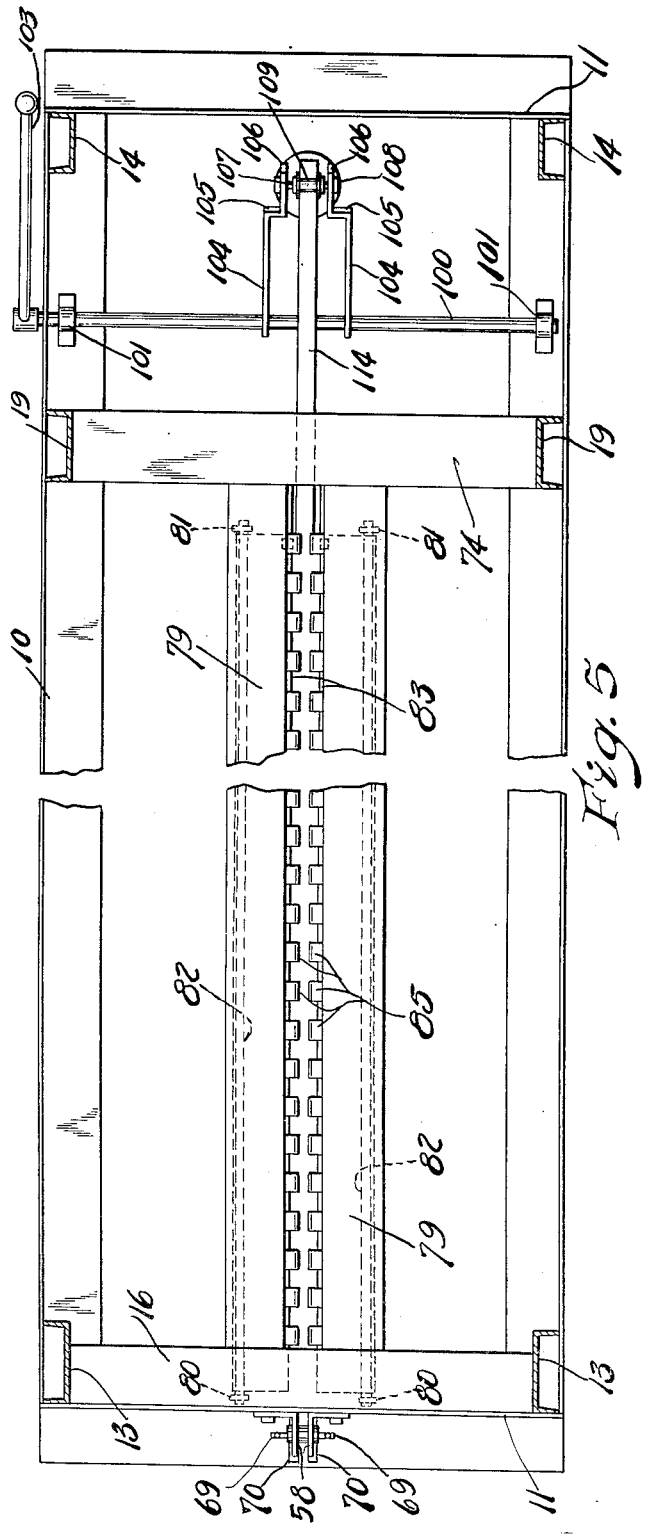
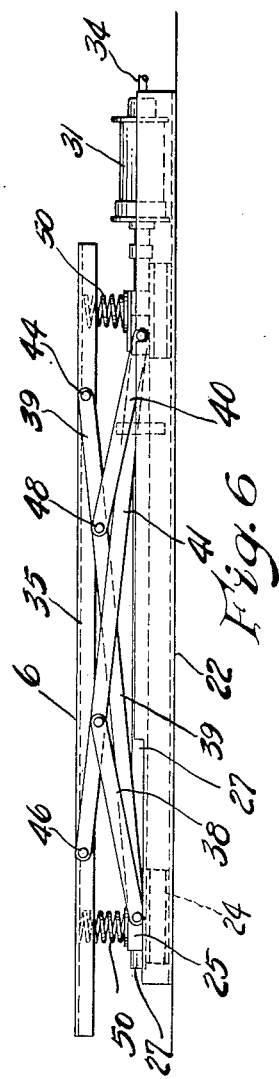
INVENTOR.
Henry B. Trombley
BY Frank C. Harman
ATTORNEY April 7, 1953          H. B. TROMBLEY          2,634,354
SEAM WELDING MACHINE FOR PIPES Filed April 5, 1951          4 Sheets—Sheet 4

INVENTOR.
Henry B. Trombley.
BY
Frank C. Learman,
ATTORNEY

Patented Apr. 7, 1953

2,634,354

UNITED STATES PATENT OFFICE 2,634,354

SEAM WELDING MACHINE FOR PIPES

Henry B. Trombley, Bay City, Mich., assignor to The Michigan Pipe Co., Bay City, Mich.

Application April 5, 1951, Serial No. 219,329

7 Claims. (Cl. 219—6)

The present invention relates to seam welding machines, and more particularly to a welding machine for welding the seam of pre-formed pipe, conduits and other workpieces of cylindrically formed metal blanks.

One object is to provide a seam welding machine for welding the end edges of cylindrically bent and pre-formed metallic sheets to produce a metallic pipe having a single longitudinal seam welded joint.

Another object is to provide a seam welding machine for pipes and the like in which the pipe blank is held in position with its end edges in abutting relation throughout the entire length of the seam so that the welding head can be bodily moved longitudinally of the pipe for welding the seam without causing undue stresses or strains to be set up in the pipe during the welding operation.

Another object is to provide a welding machine in which a pre-formed pipe blank of sheet metal bent cylindrically and tack welded at spaced intervals along the end edges of the metal sheet is properly held in position by means of a series of clamping fingers which clampingly engage the end edges of the blank on each side of the seam with even pressure throughout the entire length of the seam such that the end edges of the pre-formed blank will be properly spaced for the reception and deposition of the weld metal introduced to the seam.

Another object is to provide a seam welding machine for holding a pre-formed cylindrical blank in proper position throughout the entire length of the seam by a series of equidistantly spaced gripping fingers in frictional engagement with the ends of the cylindrical blank along the seam, and on each side thereof, to insure a more even distribution of the weld metal and to produce a welded seam of uniform dimensions.

Another object is to provide a seam welding machine for pipe in which the pre-formed cylindrical pipe blank is removably supported on a releasable platen and anvil arranged to facilitate the easy loading of the pipe blanks for welding, and the quick removal of the pipe after being welded.

Another object is to provide a pipe seam welding machine having an adjustable platform which is arranged to be adjusted vertically in parallelism, with the axis of the pipe blank and the anvil and platen in true parallel relation. The platform being arranged to exert an upward pressure force on the pipe blank in such a manner that the blank is slightly distorted so that after the seam is welded, the pipe will assume a true cylindrical shape.

Another object is to provide a seam welding machine in which the gripping fingers are moved into contactual engagement with the end edges of the pre-formed cylindrical pipe blank by fluid pressure means, arranged to exert a uniform pressure force on each of the gripping fingers throughout the entire length of the pipe seam, whereby the end edges of the pipe seam will be held in true abutting relation, and in clamping engagement with the platen on the releasable anvil.

Another object is to provide a welding machine in which the releasable anvil is provided at one end with a clamping device, which can be quickly and easily operated to facilitate the quick and easy insertion and removal of pipe blanks.

Another object is to provide a welding machine having an adjustable platform for the pipe blank which is operated by pressure fluid means to properly position the pipe blank at the desired level, and exert a force on the blank at a diametral point opposite the gripping fingers.

Another object is to provide a welding machine of the above-mentioned type with gravity biased means for urging the gripping fingers out of engagement, with the end edges of the pipe seam, to hold the same in an inoperative position when loading and unloading pipe blanks in the welding machine.

Another object is to provide a pipe seam welding machine having manual control means for manipulating the gripping fingers to insure proper positioning thereof, when loading pipe blanks in the welding machine.

Another object is to provide a pipe seam welding machine in which the series of clamping fingers are urged into frictional clamping engagement, with the end edges of the pipe blank, by inflatable tubes arranged such as to exert uniform pressure on each of the gripping fingers, with the result that the ends of the pipe blank are uniformly held against the platen throughout the entire length of the seam.

Another object is to provide a welding machine for effecting a welded joint between the end edges of a cylindrically bent blank, in which the blank is held in a fixed position and the welding unit is mounted to traverse the seam and move longitudinally with the axis of the pipe.

Another object is to provide a seam welding machine in which the welding unit is bodily movable longitudinally with respect to the pipe seam, and is manually operated so that various portions of the pipe seam can be welded to form a continuous welded joint.

Another object is to provide a seam welding machine for pipe having aprons arranged on each side of the pipe to collect slag and the like, dropping from the seam during the welding thereof.

Other objects and advantages of the invention will become apparent during the course of the following description of the accompanying drawings, wherein:

Figure 1 is a side elevational view of the seam welding machine, showing the adjustable platform in an elevated position and the releasable anvil held in its operative position.

Figure 2 is an end elevational view of the seam welding machine, illustrating the manner in which the anvil is released to receive a preformed pipe of cylindrical section, and showing the gripping fingers in their inoperative position.

Figure 3 is an end elevational view of the opposite end of the welding machine, showing the manually controlled and gravity biased linkage system for controlling the series of gripping fingers which engage the ends of the cylindrically formed blank, and showing the manner in which the releasable anvil is supported on the frame.

Figure 4 is a fragmentary side elevational view illustrating the anvil and the manner in which the clamping device is released in dotted lines to permit the anvil to be lowered when loading and unloading pipe blanks thereon, likewise shown in dotted lines.

Figure 5 is a horizontal cross-sectional view taken on irregular lines 5—5 of Figure 1, and looking in the direction of the arrows, to illustrate the series of gripping fingers and the manual control means for manipulating the same when loading and unloading pipe blanks, and completed pipes.

Figure 6 is a side elevational view of the adjustable platform, showing the operating linkage therefor, and illustrating the platform in its lowermost position.

Figure 7:
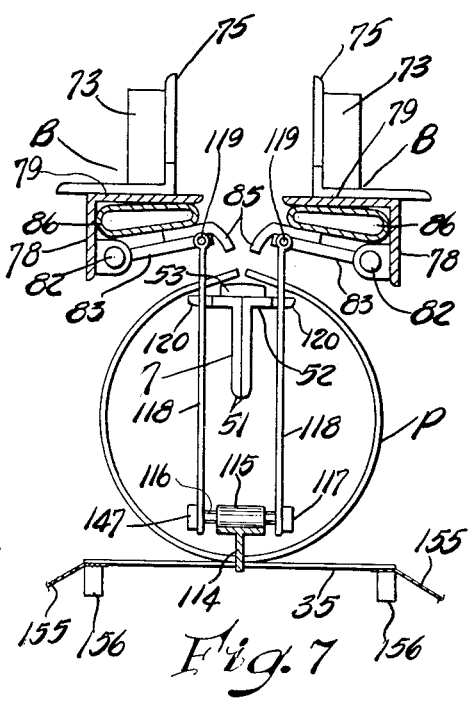

Figure 7 is an enlarged cross-sectional view taken on line 7—7 of Figure 1, and looking in the direction of the arrows, to illustrate the manner in which a pipe blank is supported on the platform and anvil with the side edges or complementary ends presented to the gripping fingers, which are shown as being held in an inoperative position by the gravity biased linkage such as when loading a pipe blank onto the anvil.

Figure 8:
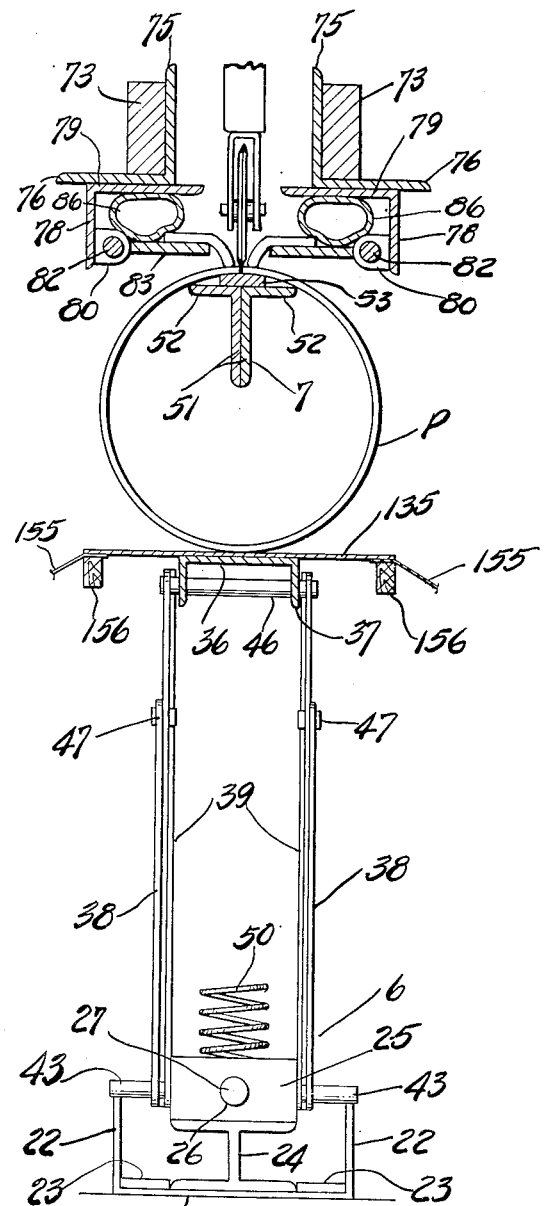
Figure 9:
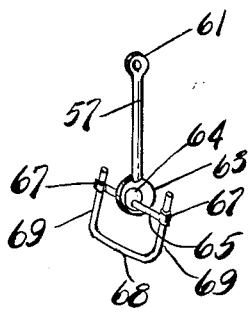

Figure 8 is an enlarged cross-sectional view taken on line 8—8 of Figure 1 and looking in the direction of the arrows, to illustrate the manner in which a pipe blank is supported on the platform with its edges held in position by the gripping fingers which are actuated by the inflatable tubes which are inflated by a pressure fluid connected to a suitable source or supply, and Figure 9 is a perspective view of the releasable clamp for engaging and holding one end of the anvil in its operative position.

In the drawings, and more in detail, there is shown for the purpose of convenience of illustration a welding machine for welding the seam of a cylindrically bent blank sheet prepared by tack welding at a few places to hold the same with the ends of the metal sheet in its cylindrical form prior to the continuous welding operation, to produce a welded seam which will be both air- and liquidtight.

Generally, the welding machine comprises a frame structure 5 having an adjustable vertically movable pipe blank supporting platform structure 6, a releasable anvil 7 for receiving the pipe blank and holding the same in position for being clamped by clamping members 8. A welding unit, likewise generally designated 9, is movable to and fro along the frame 5 with respect to the pipe blank to weld a continuous seam and join the abutting edges of the cylindrically bent or pre-formed blank which has been prepared by tack welding the seam at a few spaced apart locations, such as at the ends of the blank.

The frame structure 5 includes side frame members 10 of angle section, which are connected at their ends by transverse frame bars 11, likewise of angle section, suitably held in place by welding or the like. The frame members 10 and 11 are supported above the floor surface on transverse blocks 12 and secured within the corners of the frame members 10 and 11 are upright frame members 13 and 14 of channel section. The uprights 13 and 14 are secured in place by welding or the like, as before, and are connected together adjacent their upper ends by side frame members 15 and end frame members 16—17.

Adjacent the right hand end of the machine, Figure 1, at each side thereof, is an upright 19 of channel section which has its lower end affixed to the side frame member 10, and its upper end connected to the side frame member 15 at each side of the machine, and side brace members 20 extend between the uprights 14 and 19 to add rigidity.

Mounted centrally of the fabricated frame structure 5 is a pipe supporting platform structure 6, which includes a channel-shaped base 21 having its opposed flanges 22 extending upright. A pair of metal strips 23 are secured to the channel beam 21 in spaced apart relation and adjacent the opposed flanges 22 to form therebetween a guideway for receiving a guide block 24 of H section. Formed on the upper portion of the guide block 24 is a head 25 having an opening 26 for receiving a longitudinal control rod 27. The opposite end of the base 21 is provided with a similar block 28 which is rigidly secured in position, and is provided with a head having an opening in alinement with the opening 26, for receiving the control rod 27, and said head is designated by the reference character 29. The control rod 27 is connected to the piston rod 30 of a control cylinder 31 which is anchored between the opposed flanges 22 of the base 21, and a suitable coupling 32 is provided for adjustably coupling the control rod 27 and the piston rod 30. Pressure fluid supply pipes 33 and 34 are connected to a suitable pressure source such as the air reservoir of a compressor pump, and suitable valves are interposed for controlling the admission of air under pressure to opposite sides of the cylinder 31. A pin (not shown) is provided for connecting the control rod 27 to the slidable guide block 24 and extends through the head 25 thereof. Thus, when the piston rod 30 is reciprocated to and fro the guide block 24 will be correspondingly moved.

The adjustable platform includes a plate 35 which is disposed beneath the anvil 7, and said plate is provided with a channel bar 36 on its underside, having its opposed flanges 37 extending downwardly. The platform 35 is connected to the blocks 25 and 29 by compound links 38—39 and 40—41 arranged in pairs. The compound links 39 have their lower ends pivotally connected to the head 25 of the guide block by pins 43 which project laterally from the head 25, and are supported on the upper edges of the opposed flanges 22 of the base 21. The other ends of the pair of links 39 are connected to the opposite end of the channel bar 36 by means of a pin 44 which extends through the flanges 37 in suitable openings therein, and projects a slight distance laterally therefrom.

Similarly, the levers 41 have their lower ends connected to the head 29 of the block 28 by means of a pin 45, while the upper end of the link 41 is connected to the opposite end of the platform 6 and to the opposed flanges 37 of the channel beam by means of a transverse pin 46 (Figure 8). The links 38 and 40 are pivoted to the heads 25 and 29 of the blocks 24 and 28 respectively, while their other ends are pivoted to the levers 39 and 40. The pair of levers 38 being pivoted to the levers 41 as at 47, and similarly the pair of levers 40 are pivoted to the pair of levers 39 as at 48. It will thus be seen, that when pressure fluid is admitted to the left hand end of the cylinder 31 through the pipe 33, the slide block 24 will move to the right and the platform 35 will be elevated to raise a pipe blank into proper position so that the seam will be presented to the welding unit.

Coil springs 50 are mounted on the blocks 25 and 29 and are arranged to engage the underside of the platform 35, to absorb shocks when the platform is lowered. The linkage system is similar to a toggle lever structure and permits the vertical adjustment of the platform 35 in true parallel relation relative to the gripping finger structure 8 and anvil 7.

Mounted above the adjustable platform structure 6 is a releasable anvil 7 which is formed of a pair of angle bars 51 arranged in face to face relation, with their flanges 52 extending in opposed relation. The angle bars 51 are connected by welding or the like, and a platen bar 53 is supported and secured to the opposed flanges 52 likewise by welding. The platen bar 53 is provided with a transversely curved surface of a shape to conform to the contour of the inner periphery of a pipe blank (Figs. 7 and 8).

One end of the anvil 7 is movably and rockably supported between a pair of angle bars 54 which are secured to a transverse frame member 55 extending between the uprights 14 at the right hand end of the machine. The opposed flanges 56 of the angle bars 54 are spaced a sufficient distance to receive the angle bars 51, and hold the anvil 7 in position.

The opposite end of the anvil 7 is releasably supported on the intermediate transverse frame bar 16 at the left hand end of the machine, and the clamping lever 57 is provided for this purpose and is supported at its upper end between the flanges 58 of a pair of bracket plates 59 secured to the transverse frame bar 16 by bolts or other threaded fasteners 60. The clamping bar 57 has its upper end enlarged and provided with an opening 61 (Figure 9) for receiving a pivot pin 62, and the lower end is provided with a ring-shaped bearing 63 for receiving a rotatable disk 64. A clamping pin 65 extends through an eccentric opening 66 in the disk 64 and is rigidly secured to the disk to rotate therewith. The ends of the clamping lever 65 are provided with eyes 67 for receiving a handle or actuator 68 of U-shaped construction having its leg portions 69 slidably received in the eyes 67. The free ends of the leg portions 69 may be enlarged to permit the sliding movement of the handle actuator 68 without the same becoming displaced from the openings of the eyes 67.

The left hand end of the anvil 7 formed by the angle bars 51 is provided with a pair of spaced projections 70 which are affixed to opposite sides of the anvil 7, and project longitudinally from the end of the anvil for removably receiving the pivoted rod 57. The clamping rod 65 being arranged to engage the lower edges of the extensions 70 (Fig. 2), so that when the handle actuator 68 is swung upwardly from its lowermost position the clamping bar 65 will rotate eccentrically with respect to the ring bearing 63 and will cause the left hand end of the anvil to be moved upwardly to its operative position.

Mounted above the anvil 7 and extending longitudinally of the frame is a pair of spaced apart beams 73, which have their ends connected to and supported by one of the transverse frame bars 16, and a transverse bar 74 extending between the frame uprights 19. The beams 73 may be welded or otherwise secured in place, and are provided with angle bars 75 which have their flanges 76 arranged in opposed relation as clearly shown in Figures 7 and 8. Secured to the underside of the opposed flanges 76 is a pair of angle bars 78 which have their flanges 79 arranged in spaced apart opposed relation and welded or otherwise secured to the under faces of the opposed flanges 76 of the angle bars 75.

Formed adjacent each end of the angle bars 78 are correspondingly positioned lugs 80 and 81 for supporting a pair of parallel rods 82 in alined openings in the respective lugs 80—81. Secured to each of the rods 82 and extending between the lugs 80—81 is a plate 83 arranged one on either side of the anvil 7 to swing vertically about the pivot axis of the rods 82. Secured to the pivoted plates 83 and projecting from the outer ends thereof, is a series of gripping fingers 85 which are inwardly and downwardly bent in a direction toward the platen 53. The gripping fingers 85 are welded or otherwise secured in equidistantly spaced apart relation on the upper surfaces of the pivoted plates 83, and the lower ends thereof are arranged in spaced apart relation to provide a pathway therebetween for the welding electrode.

Mounted above each of the pivoted plates 83 is an inflatable tube 86 which extends the entire length of the plates 83, and has one end closed, while the other end as at 87 is provided with a coupling nipple 88 to which is attached a supply pipe 89. The supply pipe 89 of each tube 86 extends through openings in a bracket plate 90 secured to the enlarged opposed flanges 91 of the anvil 7, the flanges 91 being an enlarged continuation of the flanges 52 for supporting the angle bracket 90. A supply pipe 93 is connected to the coupling 88, and has its other end connected to a suitable air pressure source having control valves (not shown) to admit air pressure to the spaced apart tubes 86 and thus urge the pivoted plates 83 and gripping fingers 85 downwardly to clampingly engage a pipe P on each side of the pipe seam.

In order to hold the pair of pivoted clamping plates 83 and their fingers 85 in an elevated position while loading or unloading pipe blanks and pipe after being welded, there is provided a gravity biased linkage system supported on the frame and adapted to normally hold the clamping plates 83 in an elevated position when the rubber tubes 86 are deflated. This structure comprises a transverse shaft 100 having its ends supported in suitable journal bearings 101 at each side of the machine, and supported on the flanges of the side frame members 10. With one end of the shaft 100 extending through an opening in the angle bar 10 at one side of the machine for receiving the hub 102 of a hand lever 103. Secured to the intermediate portion of the shaft 100 is a pair of levers 104 which have their upper ends angularly bent as at 105 (Figure 5) for providing closely spaced free end portions 106. The end portions are provided with longitudinal slots for receiving a pin 107 having heads 108 at each end thereof slightly larger than the slot to prevent displacement of the pin. A roller 109 is mounted on the pin 107, and supported on the pin 107 is a rectangular frame 110 (Fig. 3) which has vertical side legs disposed between the roller 109 and the arms 106 of the levers 104.

Supported on the rectangular bracket 110 is an adjustable weight 111 which is suspended from the bracket by means of a rod 112 which has an enlarged upper end secured to the bracket 110, while the lower end may be provided with a threaded portion for receiving a retaining nut (not shown).

Also mounted on the machine frame 5 and between the uprights 19 is a shaft 113 to which is pivoted a lever 114, which has one end extending beneath the roller 109, while its opposite end is disposed beneath one end of the pair of clamping plates 83. Formed on the end of the lever 114 opposite the end engaged by the roller 109, is a bearing boss 115 (Figure 7) which provides a bearing for a transverse pin 116 having heads 117 at each end thereof. Pivotally connected to the pin 116 is a pair of parallel levers 118 which extend upwardly at one end of the pivoted plates 83 and are pivotally connected to the outer ends of the plates by means of pivot pins as at 119. The anvil 7 has its opposed flanges 52 notched as at 120 to accommodate the actuatnig rods 118 for the clamping plates 83.

It will be seen, that the adjustable weight 111 will normally urge the clamping plates 83 upwardly when the rubber tubes 86 are deflated as shown in Figure 7, and that by manipulating the hand lever 103 at one side of the machine the clamping plates 83 may be manually adjusted when positioning pipe blanks of cylindrical shape for welding. That is to say, that the clamping plates 83 and their clamping fingers 85 may be adjusted while positioning the seam of a pipe blank on the anvil 7, and prior to the inflation of the tubes 86 to properly aline the seam of the pipe for presentation to the welding electrode.

The welding unit 9 is of conventional construction and includes a platform 121 having electrical control mechanism 122, and an upstanding bracket plate 124 for supporting a reel shaft 125 on which is mounted a reel 126. The welding unit 9 is supported on a pair of channel beams 127 which are arranged in opposed relation secured in place by welding or the like, and said channel beams are supported between the uprights 13 and 14 on brackets 129 and 130 respectively. The bracket 129 is suspended and also supported from the cross beam 16 at one end of the machine by suspension rods 131 which have their lower ends threaded for receiving threaded fasteners to secure the plate 129 in position. One end of the plate 129 may be welded or otherwise affixed to the upright 13. The other bracket plate 130 is formed with an angle portion 133 which is welded to the upright 14 on the corresponding side of the machine.

A track plate 134 is welded to one of the channel beams 127 and has the upper edge thereof projecting beyond the channel beams to provide a guide trackway for a roller 135 supported on the platform 121 by means of a bracket 136 affixed to the platform 121 in any suitable manner.

Formed integral with the platform is a depending bracket plate 138 which is provided with an arm 139 for rotatably supporting a roller 140 (Fig. 3). The roller 140 engages the opposed face of one of the channel beams 127 to movably support the welding unit 9 for sliding movement longitudinally of the frame 5. It being understood that supporting rollers 140 are mounted at each end of the platform 121, while a single roller 135 is mounted on the opposite side of the platform 121.

Supported on the depending bracket plate 138 is a flux box 142 for containing a quantity of welding flux to produce a slag and inert gas at the welding point as usual. Wound on the drum 126 is a welding electrode 143 which passes through the flux box 142 so that a coating of flux will be extruded on the welding electrode 143, before the same is presented to the seam to be welded. The electrode 143 is automatically fed to the seam by conventional mechanism, and the end of the electrode is adapted to first contact the metal to initiate the arc, and is then automatically raised a slight distance for traversing the seam. The electrical connections with the electrode and anvil of the welding machine are not shown, since they are conventional in electric arc welding. The extruding nozzle 150 is mounted on the lower end of the flux box 142, and is provided with a central opening of an enlarged diameter and greater than the diameter of the electrode to provide a relatively heavy flux coating on the electrode as it is fed forwardly during the welding operation.

In order to catch excessive flux and slag during welding canvas aprons 155 are connected to each side of the supporting platform 35 by being interposed between the under surface of the platform 35 and a clamping bar 156 secured in place by suitable fastening elements (not shown). The outer edges of the canvas aprons 155 are supported by clips 157 attached to the frame structure at suitable locations, and preferably between the uprights 18 and 19. The canvas aprons 155 are provided with strips 158 secured along their outer edges which are received in the clips 157 at the ends thereof. Thus, the rods 158 may be lifted vertically to displace the same from the clips 157 and permit the removal of the accumulation of excessive flux and slag deposited on the aprons 155.

The extruding nozzle 150 is presented and extends downwardly between the angle beams 75 so that the electrode 143 may be fed to the seam of the pipe P between the frictional gripping and clamping fingers 85.

In operation, a pipe blank is formed from a sheet of rectangular metal of a length corresponding to the length of pipe desired. The rectangular metal sheet is bent or preformed to cylindrical shape with the ends of the cylindrically bent sheet in closely spaced relation. The pipe blank thus formed may be prepared by tack welding the ends of the seam prior to installation or loading in the welding machine or if desired, this can be accomplished in the machine itself. After the pipe blank is thus formed to substantially true cylindrical shape, it is loaded into the welding machine by releasing the clamping bar 57 by swinging the handle 68 downwardly from the position shown in Figure 1 to the position shown in Figure 2. This permits the bar 65 to drop downwardly by reason of the fact that the bar is secured to the eccentric 64, and permits the bar 65 to move downwardly out of engagement with the spaced apart projecting plates 70 affixed to one end of the anvil 7 on each side thereof. By then swinging the clamping bar 57 about the pivot pin 62 in a direction outwardly, the anvil 7 will drop downwardly at one end as shown in dotted lines in Figure 4.

The pipe blank can then be slipped longitudinally over the anvil 7 with the seam resting upon the platen 53. After the pipe blank P has been positioned on the anvil 7, the handle 68 is swung inwardly and upwardly to lock the free swinging end of the anvil in position. When the handle 68 is swung upwardly over the ends of the projecting bars 70, the anvil will be securely held in place. It being understood, that the rubber tubes 86 are deflated and that the clamping fingers 85 are held in an elevated position by the gravity biased lever 114. After the pipe blank P has been placed on the anvil the hand lever 103 can be moved to the left (Figure 5) so as to permit the clamping plates 83 and gripping fingers 85 to move downwardly into engagement with the ends of the circularly bent sheet to properly position the seam and center the same with respect to the welding electrode 143. After the clamping fingers 85 have been properly positioned with respect to the seam, pressure fluid or air under pressure is admitted to the pipes 34 and 93 to elevate the platform 35 against the underside of the pipe and inflate the rubber tubes 86 so as to cause the gripping fingers 85 to frictionally and tightly engage the metal at each side of the seam and press the same into engagement with the curved surface of the platen 53. The platform 35 urges the pipe upwardly with sufficient pressure to hold the meeting edges in close relation and in true circular registration.

The welding electrode 143 is then lowered automatically into engagement with the seam of the pipe P to strike an arc and is likewise automatically raised a slight distance after the arc has been struck. The welding unit 9 is then moved along the trackway 127 to form a continuous welded seam for the meeting edges of the pipe P.

The flux extruded on the electrode cable 143 is consumed less rapidly than the metal of the electrode which serves to concentrate the arc and shield the rubber tubes 86 against excessive heat. Similarly, the gas generated by the flux concentrates the heat in the area of the seam and prevents the pivoted plates 83 and rubber tubes 86 from becoming damaged. Excess flux and slag formation falling away from the seam on both sides of the pipe are caught by the aprons 155 and accumulates as at 160.

After the pipe seam has been welded by manually moving the welding unit 9 to and fro along the guide trackway 127, the tubes 86 are deflated and the hand lever 103 is shifted so that the weight 111 will urge the clamping plates 83 and gripping fingers 85 upwardly and out of engagement with the metal at each side of the welded seam. Similarly, the control valves for the cylinder 31 are manipulated to permit the platform 35 to be lowered. Next, the clamping lever 57 is released as previously described to allow the anvil 7 to drop downwardly so that the completed or seam welded pipe can be removed from the anvil by being slid longitudinally therefrom at one end of the machine.

In the event that the pre-formed pipe P is tack welded in the machine, the operation is similar to that previously described and the gripping fingers 95 are manipulated by operation of the hand lever 103 until the joining ends of the pipe have been properly positioned in longitudinal alinement with the center of the platen 53. After the pipe blank has been properly positioned, it can be tack welded at the ends and then continuously welded along the seam to prevent distortion created by excessive heat. In accordance with accepted welding practice the continuous seam may be accomplished by welding centrally and working toward each end, and since the welding unit 9 is manually controlled, this can be easily facilitated.

After the pipe seam has been continuously welded, the completed pipe P can be removed and subjected to heat treating processes if desired to remove stresses and strains created by the welding heat, and the finished pipe product can be employed for various purposes as a conduit for liquids or the like which is completely leakproof.

It is to be understood, that the form of the invention herewith shown and described is to be taken as a preferred embodiment and that various changes in the shape, size and arrangement of parts may be resorted to without departing from the spirit of the invention or the scope of the subjoined claims.

I claim:

1. In a seam welding machine, an elongated trackway, a welding unit movably mounted on said trackway, an anvil mounted beneath said welding unit for supporting a cylindrical pipe blank with its seam presented to said welding unit, a vertically adjustable platform beneath said anvil and a handle on said machine to support one end of said anvil and hold the same in its operative position, said handle being eccentrically pivotal on said machine to lower said end of the anvil and swingable out of engagement therewith to allow the loading and unloading of said pipe blank.

2. In a seam welding machine, a trackway, an electric welding unit movable to and fro along said trackway, an anvil positioned beneath said welding unit for receiving a pipe blank to be welded with the pipe seam presented to the welding unit means on one end of said machine supporting one end of said anvil to allow limited swinging movement thereof in a vertical plane, a lever pivotally mounted on the opposite end of said machine to swing in a vertical plane, a handle eccentrically mounted on said lever to normally support the opposite end of the anvil and swingable downwardly to lower said opposite end, said handle being disengageable from said anvil and swingable outwardly therefrom on said lever, to permit pipe blanks to be moved longitudinally over said anvil, clamping means arranged on each side of said anvil for clampingly and frictionally urging the ends of the pipe blank into contactual engagement with the anvil, means for controlling said clamping means and a vertically adjustable platform mounted beneath said pipe blank for exerting an upward force on said pipe in opposition to said clamping means.

3. In a seam welding machine, a trackway, an electric welding unit movable to and fro along said trackway, an anvil mounted beneath said welding unit for slidably receiving a cylindrical blank having a seam to be welded with the seam presented to the welding unit, releasable means for supporting one end of said anvil to permit the loading and unloading of cylindrical pipe blanks and pipe with respect to said anvil, a longitudinally disposed shaft mounted on each side of and above said anvil, a series of closely spaced, clamping fingers pivotally mounted on and arranged the entire length of each shaft for clampingly engaging the ends of the cylindrical blank between said anvil, pressure means for urging said clamping fingers into clamping engagement with said pipe blank a vertically adjustable platform beneath said pipe blank for exerting an upward pressure thereon, and manual control means for pivoting said shafts to permit the same to be adjusted independently of said air pressure means.

4. In a disengageable support, means for supporting one end of an anvil in a seam welding machine, the combination comprising a lever on one end of said machine mounted to swing vertically in the longitudinal plane of the anvil, a handle member normally supporting said one end of the anvil in operative position, said member being eccentrically pivotal in said lever and swingable downwardly in a longitudinal plane to lower said end of the anvil, said lever and handle being swingable out of engagement with said end of said anvil to permit pipe blanks to be loaded thereon.

5. The combination as defined in claim 4 in which a pivotal disk is provided off-center in the free end of said lever, said disk being provided with an off-center opening, and said handle comprises a U-shaped member and a cross bar connecting the free ends thereof, said cross-bar being accommodated in said off-center opening in said disk, and rigid therein to pivot said disk when said handle member is swung.

6. In a seam welding machine, an electric welding unit movable along a pathway, an anvil beneath said pathway for supporting a pipe blank with its seam presented to said welding unit, means on one end of said machine supporting one end of said anvil to allow limited pivotal swinging movement of said anvil in a vertical plane, a lever pivotally mounted on the opposite end of said machine to swing in a vertical plane, a handle member including a cross-bar eccentrically pivotal in said lever, normally supporting the opposite end of said anvil, said handle member being disengageable from said anvil to permit the loading and unloading of pipe blanks on and from said anvil when said handle has been swung downwardly to lower said opposite end of said anvil.

7. In a seam welding machine, an elongated frame structure, a trackway supported by said frame structure, an electric welding unit movable to-and-fro along said trackway, a longitudinally disposed anvil beneath said welding unit, eccentrically pivotal supporting means for releasably supporting one end of said anvil on the frame structure to permit cylindrical blanks having a seam to be slid longitudinally over said anvil, pivotally mounted clamping members arranged the entire length of said anvil for engaging the edges of said cylindrical blanks to force them into intimate abutting relationship and to hold the same in frictional engagement with the anvil while the welding unit is moved to-and-fro to weld the seam, air pressure means mounted above the pivoted clamping members for urging them downwardly to operative position, gravity biased means for urging the clamping members up to inoperative position, a transverse shaft spanning one end of said machine, means mounted thereon connected with said clamping members and handle means for actuating said shaft and adjusting said clamping members independently of said air pressure means.

HENRY B. TROMBLEY.

REFERENCES CITED

The following references are of record in the file of this patent:

UNITED STATES PATENTS

| Number | Name | Date |
| --- | --- | --- |
| 1,612,317 | Reed | Dec. 28, 1926 |
| 1,668,783 | Rupley | May 8, 1928 |
| 1,782,316 | Robinoff | Nov. 18, 1930 |
| 1,975,581 | Klein | Oct. 2, 1934 |
| 1,983,930 | Carlsen | Dec. 11, 1934 |
| 1,987,664 | Brown | Jan. 15, 1935 |
| 1,997,296 | Free | Apr. 9, 1935 |
| 1,987,691 | Lincoln | Jan. 15, 1935 |

FOREIGN PATENTS

| Number | Country | Date |
| --- | --- | --- |
| 381,527 | Great Britain | Oct. 6, 1932 |
| 628,424 | Germany | Apr. 3, 1936 |